Nov. 21, 1939.   L. M. ABBATE   2,180,655

ELECTRIC SIPHON COFFEE MAKER

Filed March 1, 1938   2 Sheets-Sheet 1

Louis M. Abbate
INVENTOR

BY Victor J. Evans & Co.
ATTORNEYS

R. E. Wise
WITNESS

Nov. 21, 1939.  L. M. ABBATE  2,180,655
ELECTRIC SIPHON COFFEE MAKER
Filed March 1, 1938  2 Sheets-Sheet 2
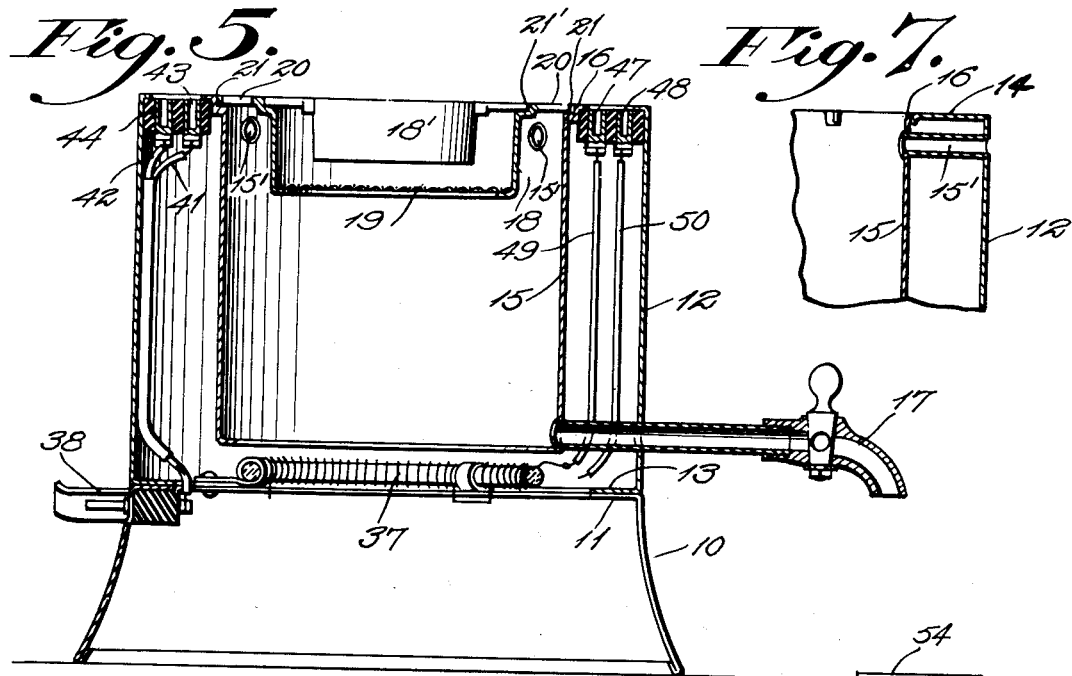
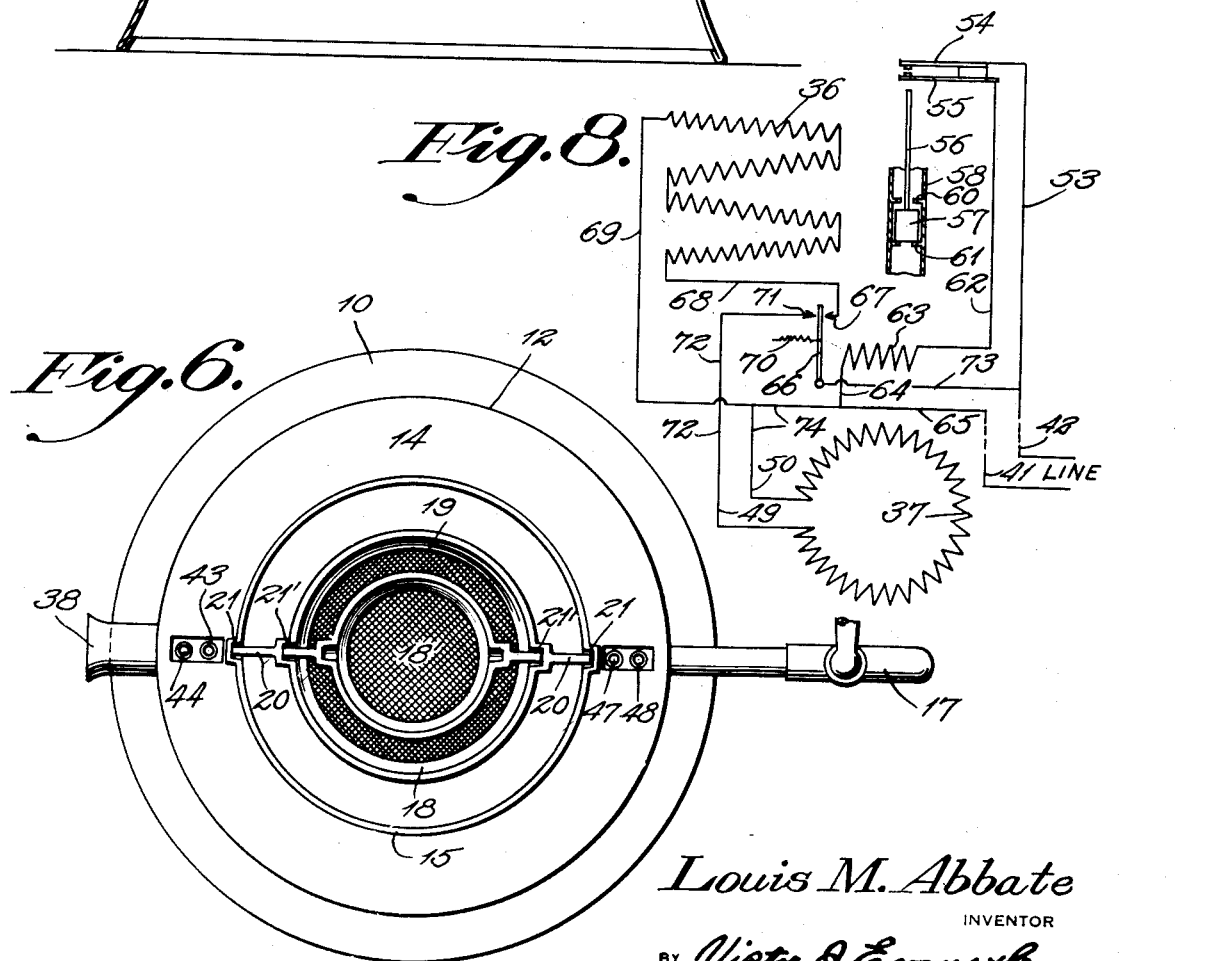
Louis M. Abbate
INVENTOR
BY Victor J. Evans & Co.
ATTORNEYS
WITNESS R. E. Wise.

Patented Nov. 21, 1939

2,180,655

UNITED STATES PATENT OFFICE 2,180,655

ELECTRIC SIPHON COFFEE MAKER

Louis Michael Abbate, Chicago, Ill.

Application March 1, 1938, Serial No. 193,345

5 Claims. (Cl. 219—43)

This invention relates to electric siphon coffee makers and, without limitation thereto, has more particularly to do with such devices for household or domestic use.

The invention has for one of its objects to improve generally upon this type of coffee making device whereby to simplify the structure without detracting from the efficiency of the device and at the same time provide for convenient access to and easy cleansing of the respective receptacles thereof.

Another object is to provide for a more rapid brewing effect and to improve the quality of the product.

A further object is to provide for the automatic control of the electrical heating elements of the device.

With the foregoing and other objects in view, as will hereinafter more fully appear, the invention consists in the general structure and parts and combinations and arrangements of parts thereof, all as hereinafter described and pointed out with particularity in the appended claims, reference being had to the accompanying drawings illustrating a practical adaptation of the invention, and in which Figure 1 is a perspective view of the complete device, showing its general external form;

Figure 2 is a vertical section taken diametrically through the upper unit of the device;

Figure 5 is a vertical section taken diametrically through the lower unit and base portion of the device;

Figure 6 is a top plan view of the lower unit;

Figure 7 is a fragmentary section illustrating structural details of the upper portion of the lower unit; and Figure 8 is a diagram of the respective electrical heating elements and the electrical circuits and controlling means thereof.

Figure 1:
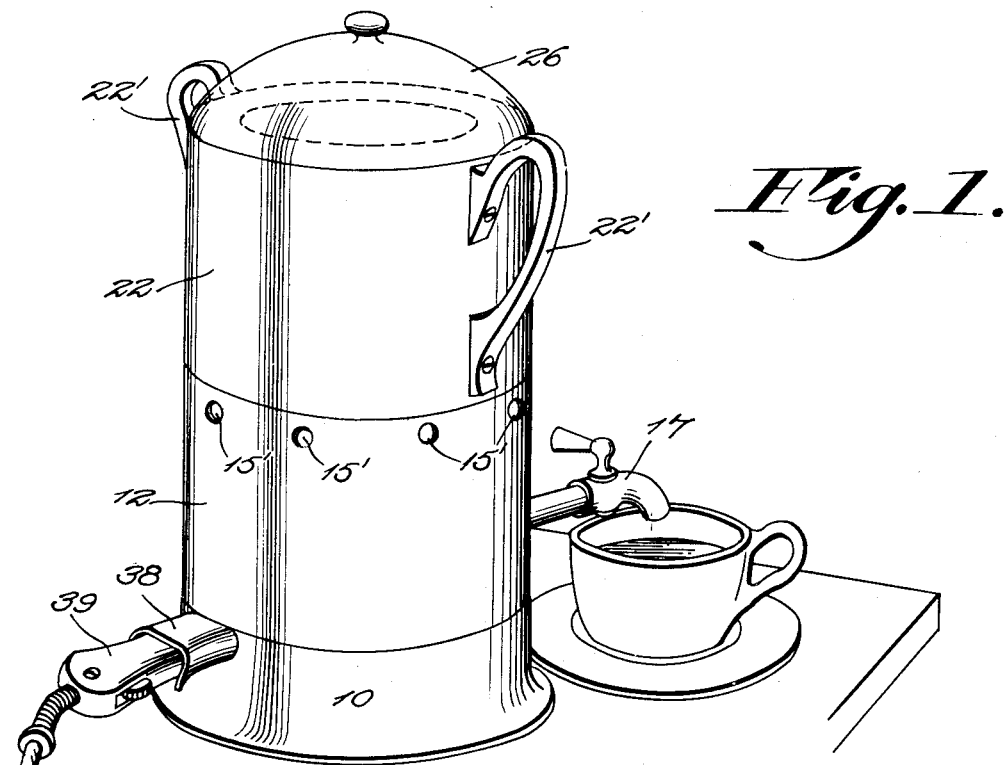

Referring now to the drawings, the numeral 10 designates the base or supporting stand of the device, which, as shown, is in the form of a downwardly flared ring, at the top of which is an inturned annular flange or collar 11. Mounted on the base 10 is a cylindrical hollow casing or shell 12 which houses the lower section or unit of the device, said casing 12 having an inturned annular flange 13 at its lower end which rests on the flange 11 of the base 10 and may be secured thereto in any desirable manner, either fixedly or detachably.

As shown more clearly in Figure 7, the casing 12 has an inturned annular flange 14 at its upper end on which an inner receptacle 15 is supported in annularly spaced relation to said casing 12. Preferably, the upper marginal portion 16 of the inner receptacle 15 is welded or otherwise secured to the flange 14, said portion 16 being merely flared, as shown in Figure 7, or off-set angularly as shown in Figure 5. This inner receptacle 15 receives the brewed coffee, as will be later more fully described, and it is provided with a faucet or tap 17.

At the top of the receptacle 15 provision is made for the attachment of a ground coffee holder and filter element 18 which may be of any approved structure, but, as shown, comprises a body ring across the bottom of which is placed suitable porous material, either ordinary filter cloth or wire mesh fabric 19, and at its upper marginal portion is provided with diametrically opposed radial arms 20 which are received in recesses 21 provided therefor in the upper portion of the receptacle 15. In this connection, it is preferable to provide the ring 18 with recesses 21' corresponding to the recesses 21 of said receptacle 15 so as to receive a supplemental filter element 18' of lesser diameter and depth than said element 18, it being understood that the smaller element 18' may in turn receive a still smaller element of the same character, and so on, depending upon the number of these elements it is desired to provide in the apparatus.

Numeral 22 designates the upper section or unit of the device, said upper unit being of general cylindrical form, and, as shown, of substantially the same diameter as the lower unit 12 on the upper flange 14 of which said unit 22 is detachably supported.

As shown more clearly in Figure 2, the upper unit 22 includes an outer cylindrical shell which is provided with a flat bottom closure plate 23 and it has an inturned annular flange 24 at its top similar to the flange 14 of the lower unit 12. Within the upper casing 22 is an inner receptacle 25 which is supported on the flange 24 in a manner similar to the mounting of the inner receptacle 15 on the flange 14 of said lower casing 12. This upper receptacle 25 is open at its top, but the complete upper section or unit 22 is provided with a removable cover 26 as shown in Figure 1.

Figures 3, 4:
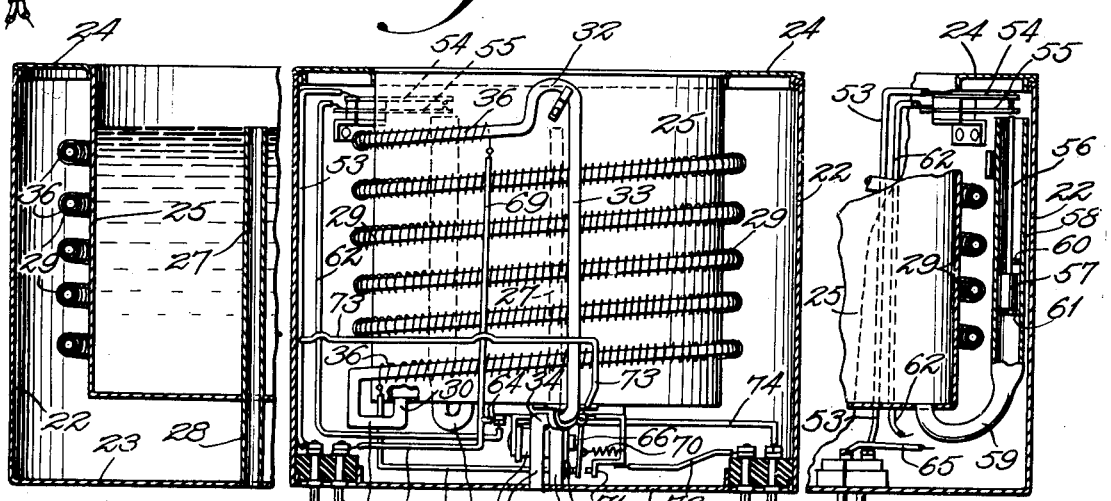
Figure 3 is a fragmentary section showing structural details of the upper unit.
Figure 4 is a view similar to Figure 3 but further showing the electrical switch controlling means.

The inner receptacle 25 of the upper unit 22 constitutes the water reservoir and it is provided with means for limiting the original water level therein, said means, as shown, comprising an over-flow tube 27 which extends upwardly from the bottom of the receptacle 25 to a horizontal plane short of the top of the receptacle and at its lower end portion 28 it is extended through the bottom plate 23 of the outer casing 22 (see Figure 3).

Surrounding the inner receptacle 25 is a coiled pipe 29, the lower end portion 30 of which is connected into the bottom of the receptacle 25, whence it extends vertically downward, thence horizontally, and vertically upward at substantially right angles at each turn, as at 31, before being coiled about the receptacle, the upper end portion of the coil being looped upwardly and rounded, as at 32, thence vertically downward, as at 33, and the extreme lower end portion is carried radially inward, as at 34, and thence axially downward, as at 35, through the bottom of the plate 23 of said outer casing 22.

Coiled about the several convolutions of the pipe coil 29, with suitable electrical insulation but ample heat conductivity therebetween, is an electrical resistance wire 36 by which the pipe coil may be highly heated. As the water is supplied in the receptacle 25 to its predetermined level, which is governed by the overflow tube 27, it will reach a corresponding level in the coil 29, and when the coil 29 becomes heated the water therein is in turn heated, and due to the pressure of steam thereby generated, the water rises into the looped portion 32 and thus starts a siphonic action whereby the water in said receptacle 25 will continue to flow out therefrom through the coil 29 and out through the extensions 33, 34 and 35 until the supply in the receptacle is depleted. The water is discharged from the pipe portion 35 into the lower inner receptacle 15 in a highly heated state. In this connection it is noted that the relative angularity of the lower looped portion 30 of the pipe coil 29 is an important feature of the invention in that it effectively resists back pressure into the lower portion of the receptacle 25, while the rounding of the upper looped portion 32 facilitates the outflow from the coil 29 so that the siphonic action begins almost immediately when the water becomes heated to an appreciable degree within the coil 29 and continues until the receptacle 25 is emptied.

As the hot water discharged from the pipe end 35 into the lower receptacle 15 is delivered into the ground coffee holder and filter element 18 in which a predetermined quantity of ground coffee is placed the water is percolated through said ground coffee and is filtered through the fabric 19 in the bottom of the element 18 and received in the lower portion of the receptacle 15 from which the brewed beverage is drawn for use through the faucet 17. In order to get a more effective contact of the water with the coffee in passing through the filter 18, and also to vary the strength of the resultant beverage, a plurality of the filtering elements of proportionately decreased dimensions may be provided and located one within the other in any desired manner, as hereinbefore described. And to maintain the beverage in a heated condition within the receptacle 15, until drawn therefrom for use, a heating coil 37 is provided in the lower portion of the casing 12 beneath said receptacle 15.

In carrying out the present invention it is preferable to arrange the electrical circuits for the respective heating coils 36 and 37 so that the element 37 beneath the receptacle 15 is inactive during the time that the element 36 for the pipe coil 29 is active and until such time as the water shall have been completely siphoned from the upper receptacle 25. For this purpose the base is provided with a suitable socket 38 for the reception of a plug 39 of an ordinary extension cord 40 from an electrical outlet. From the terminals of the socket 38 within the base portion 10, circuit wires 41 and 42 respectively lead to sockets 43 and 44 located on the under side of the upper flange 14 of the lower casing 12. The sockets 43 and 44 receive terminal pins 45, 46, respectively, which project from the bottom plate 23 of the upper casing 22 and are connected at their inner ends to circuit wires for the heating coil 36 and a controlling relay for the circuit of the lower heating coil 37 as will be presently more fully described.

Diametrically opposite the sockets 43, 44, is another pair of sockets 47, 48, from which wires 49, 50, lead respectively to the opposite terminals of said lower heating coil 37. These sockets 47, 48, receive terminal pins 51, 52, located diametrically opposite to the pins 45, 46, at the bottom of said upper casing 22, said terminal pins 45, 46, 51 and 52 serving as dowels for detachably fastening said upper casing 22 on the lower casing 12 in addition to functioning as electrical terminal elements.

From the terminal pin 46 a circuit wire 53 leads to a switch element 54 which is opposed to a similar element 55, said elements 54 and 55 being either inherently resilient or having provision whereby they are normally spread apart, and, for the purposes of the present invention they have a float controlled element 56 associated therewith whereby to be placed in circuit closing contact with each other while the water supply is maintained in the receptacle 25, said element 56 and its correlated parts being shown more or less conventionally in Figures 2 and 4 and in diagram in Figure 8. As shown, the element 56 comprises a plunger rod which is mounted on a float 57 located within a tubular column 58 which has a downwardly looped connection 59 with the bottom of the receptacle 25, said float operating between opposed stops 60, 61, at a location sufficiently low in the tube 58 whereby the float is raised and the two switch elements 54 and 55 are in circuit closing contact with each other as long as there is water in the receptacle 25, it being of course understood that as soon as the supply of water is depleted in the receptacle 25 there is not sufficient water remaining in the downwardly looped portion 59 of the column extension 60 to lift said float 57. It is also here noted that while the stops 60, 61, limit the vertical movement of the float 57, neither they nor the float interfere with the flow of the water in the tube 58, and that overflow in said tube is prevented because its upper end is in a plane above that of said overflow tube 27 in the receptacle 25.

From the switch element 55 a wire 62 leads to a magnet coil 63 of a relay and the circuit is completed through a wire 64 connecting the opposite end of a line wire 65 leading to the terminal pin 45. Thus, with the switch members 54, 55, closed and the circuit completed through the coil 63 of the relay, the armature 66 of the relay is drawn in contact with the terminal 67 from which a wire 68 leads to one end of the heating coil 36, the circuit for the coil 36 being completed through a wire 69 connected to the wire 65 leading to the terminal pin 45, and during which time the circuit for the lower heating coil 37 is broken.

When the float 57 is lowered, upon the depletion of the water in the upper receptacle 25, and the plunger 56 is retracted so that the switch elements 54, 55, move out of contact with each other and the circuit for the relay coil 63 is thereby broken, the armature 66 of the relay is pulled by a spring 70 out of engagement with the terminal 67 and into engagement with an opposed terminal 71, from which latter a wire 72 leads to the terminal pin 51 on the under side of the bottom plate 23 of said upper casing 22 and is connected through the socket 47 in the assembled device to the wire 49. From the armature 66 of the relay a wire 73 leads to the wire 53 which is connected to the terminal pin 46, while from the wire 69 a wire 74 leads to the terminal pin 52 which latter when inserted in the socket 48 completes the circuit through the wire 50. By this provision, the heating coil 37 remains energized after the relay armature 66 engages the terminal contact 71 and until the plug 39 is withdrawn from the socket 38. This is to keep the brewed beverage in the receptacle 15 in a heated condition until drawn off through the faucet 17 for use. In this connection, it is obvious that some approved automatic circuit breaking means may be provided for the circuit of the lower heating coil 37 to become effective when the liquid content of the lower receptacle 15 is depleted.

It is to be understood that the two casings 12 and 22 may be lined with suitable heat insulating material (not shown) and the upper casing 22 is preferably provided with handles 22' as shown. By this provision, it is obvious that the heat is retained interiorly of the two casings 12 and 22 and the upper casing is readily lifted from the lower casing by grasping the handles 22'. It is also noted that the electrical circuits for both the upper and lower heating elements are broken when the upper casing is detached from the lower casing, and further that providing the terminal pins or dowels on the upper section and the respective sockets in the lower section the liability of injury to the person handling the device is avoided even though the extension cord is not disconnected from the socket on the lower unit or from the wall socket.

In order to permit the escape of steam generated within the inner receptacle 15 of the lower unit, any suitable vent opening may be provided. Preferably, open ended tubes 15' are extended radially across the annular space between the outer casing 12 and cylindrical wall of the inner receptacle 15, the opposite end portions of said tubes 15' being welded or otherwise fastened with a leak-tight fit in apertures provided therefor in the respective wall portions (see Figures 1, 5 and 7). It is further noted that while a single siphon pipe coil 29 may be relatively proportioned for the discharge of a given volume of water per minute from the upper receptacle 25, as hereinbefore described, a plurality of such coils may be provided and each coil individually equipped with a heating element, either collectively or separately controlled as may be desired. So, too, in some cases, instead of coiling the siphon pipe 29 around the receptacle 25 as shown, the pipe may be in a single vertical stretch between the lower right angular loop 31, and the rounded upper loop 32, and as many of these single vertical siphon units may be provided as desired.

In the matter of the siphon pipe 29, it is here noted that the rectangular downwardly looped lower end portion 31 of the pipe is of relatively larger diameter than the stretch that is coiled around the receptacle 25 between said lower looped portion 31 and the rounded upper looped portion 32 of the pipe, and that said upper looped portion 32 and downwardly extending portions 33, 34 and 35 are also of larger diameter than said coiled portion of the pipe 29. For example, in some practical adaptations of the invention, the coiled portion of the pipe 29 may be $\frac{7}{8}$ of an inch in diameter while the lower looped portion 30 may be $\frac{7}{8}$ of an inch in diameter, by which relative difference in diameters drainage of the coiled portion of the pipe 29 is assured after the water has been siphoned from the receptacle 25. So, too, by increasing the diameter of the pipe where the coiled portion of the pipe 29 merges into the upper looped portion 32 and by gradually increasing the diameter from said looped portion 32 to the end of the lower portion 35, for example, by increasing the diameter from $\frac{7}{8}$ of an inch at the beginning of the looped portion 32 to $\frac{7}{8}$ of an inch in diameter at the end of the portion 35, blockage of the downward extending portion 33 of the piping by the presence of steam bubbles is avoided because there is room for expansion and movement of the bubbles with the outflow of the water. Hence, by this provision not only is interference with the starting of flow in the siphon prevented upon the heating of the water in the pipe coil 29, but at the same time the coil is drained after the contents have been siphoned from the receptacle 25 and the starting of the siphon will not occur immediately upon the refilling of the receptacle but only after the pipe coil 29 is again heated. However, the particular dimensions of the siphon piping is not of the essence of the invention as the dimensions may be varied in different structural adaptations.

Obviously, the structure admits of considerable further modifications within the spirit and scope of the invention, as defined by the appended claims. Therefore, the invention is not limited to the specific construction and arrangements shown in the accompanying drawings.

What is claimed is:

1. In an electric coffee maker, a cylindrical lower unit and a correspondingly cylindrical upper unit detachably mountable on said lower unit, said lower unit comprising an outer casing and a concentric inner beverage receptacle in spaced annular relation to said outer casing, a coffee holding and filtering element located in the upper portion of said beverage receptacle in the lower unit, said upper unit comprising an outer casing and a concentric water receptacle within said outer casing in spaced annular relation thereto, a helical siphon pipe coil surrounding said water receptacle in said upper unit casing, the lower end of said coil being communicably attached to the bottom of said receptacle and the upper end portion of the coil being looped upwardly in a plane above the normal level of the water in said receptacle and having a downward vertical extension from said looped portion terminating in discharging relation below the receptacle and above the coffee holding and filtering element of said lower unit, and means for heating said siphon pipe coil.

2. In an electric coffee maker, a cylindrical lower unit and a correspondingly cylindrical upper unit detachably mountable on said lower unit, said lower unit comprising an outer casing and a concentric inner beverage receptacle in spaced annular relation to said outer casing, a coffee holding and filtering element located in the upper portion of said beverage receptacle in the lower unit, said upper unit comprising an outer casing and a concentric water receptacle within said outer casing in spaced annular relation thereto, a helical siphon pipe coil surrounding said water receptacle in said upper unit casing, the lower end of said coil being communicably attached to the bottom of said receptacle and extending therefrom with abrupt angular turns, first downwardly, thence horizontally and vertically upward, and the upper end portion of the coil being roundingly looped upwardly in a plane above the normal level of the water in said receptacle and having a downward vertical extension from said looped portion terminating in discharging relation below the receptacle and above the coffee holding and filtering element of said lower unit, and an electrical heating element coiled about said siphon pipe coil.

3. In an electric coffee maker, a lower unit and an upper unit detachably mountable on said lower unit, said lower unit comprising a cylindrical casing, an inner cylindrical beverage receptacle located concentrically in spaced annular relation to said outer casing, an electrical heating element for said receptacle, a coffee holding and filtering element detachably mounted in the upper portion of said receptacle, said upper unit comprising a cylindrical outer casing, a cylindrical water receptacle mounted concentrically in said outer casing in annular spaced relation thereto, overflow means for determining the normal water level in said receptacle, a siphon pipe coil surrounding said receptacle, the lower end of said coil being communicably attached to the bottom of said receptacle and the upper end portion of the coil being looped upwardly in a plane above the normal water level of the receptacle, said coil having an extension from its looped upper portion disposed vertically downward and terminating substantially axially beneath said receptacle and through the bottom of said outer casing of the upper unit whereby to discharge into said coffee holding and filtering element, an electrical heating element for said siphon pipe coil, automatic means for energizing the heating element of said siphon coil and also the heating element for the beverage receptacle in the lower unit, whereby the lower heating element is inactive during the activity of the upper heating element and said upper heating element continues active until the water is siphoned from said upper water receptacle, and the lower heating element becomes active automatically upon depletion of the water in said upper receptacle.

4. In an electric coffee maker, a lower unit and an upper unit detachably mountable on said lower unit, said lower unit comprising an outer casing and an inner beverage receptacle, a plurality of interposable coffee holding and filtering elements detachably mountable one within the other and detachably supported in assembled relation within the upper portion of said receptacle, an upper unit comprising an outer casing and a water receptacle located within said outer receptacle, means for siphoning the water from said receptacle and discharging it into said coffee holding and filtering elements of the lower unit, electrical heating means for said siphoning means of the upper water receptacle, separate electrical heating means for the beverage receptacle of the lower unit, and automatic controlling means whereby the upper heating element is active only while water remains in the water receptacle and the lower heating element is energized after depletion of the water in said water receptacle.

5. In an electric coffee maker, a lower unit and an upper unit detachably mountable on said lower unit, a receptacle in the lower unit for receiving the brewed beverage, a ground coffee holder and filter element located in the upper portion of said receptacle, an electrical heating element for said receptacle, said upper unit having a water receptacle, a helical siphon pipe coil surrounding said receptacle and having an electrical heating element coiled thereabout, said siphon coil having a discharge extension depending axially below said water receptacle and located in discharging relation above the coffee holding and filter element of said lower unit, and automatic circuit controlling means whereby the heating element for the siphon coil of said upper receptacle is energized only during the presence of water in the upper receptacle and the lower heating element becomes automatically energized upon the depletion of the water in said upper receptacle.

LOUIS M. ABBATE.